(12) United States Patent
Muhonen et al.

(10) Patent No.: US 9,107,031 B2
(45) Date of Patent: Aug. 11, 2015

(54) SERVICE PROVISION IN A COMMUNICATION SYSTEM

(75) Inventors: Ahti Muhonen, Hirvivaara (FI); Jens-Peter Staack, Helsinki (FI); Timo Rantalainen, Helsinki (FI); Jan Kåll, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1221 days.

(21) Appl. No.: 10/221,618

(22) PCT Filed: Mar. 12, 2001

(86) PCT No.: PCT/EP01/02761
§ 371 (c)(1),
(2), (4) Date: Jan. 22, 2003

(87) PCT Pub. No.: WO01/69951
PCT Pub. Date: Sep. 20, 2001

(65) Prior Publication Data
US 2003/0186710 A1    Oct. 2, 2003

(30) Foreign Application Priority Data

Mar. 13, 2000  (GB) .................................. 0006028.5
Aug. 9, 2000   (GB) .................................. 0019636.0

(51) Int. Cl.
*H04W 24/00*     (2009.01)
*H04W 4/02*      (2009.01)

(52) U.S. Cl.
CPC ....................................... *H04W 4/02* (2013.01)

(58) Field of Classification Search
USPC ........... 455/456.1–456.6, 414.1–414.2, 404.2
See application file for complete search history.

(56) References Cited

U.S. PATENT DOCUMENTS

| 5,727,057 | A | * | 3/1998 | Emery et al. ............. 379/201.07 |
| 5,787,359 | A | * | 7/1998 | Nagata ........................... 455/517 |
| 5,802,454 | A |   | 9/1998 | Goshay et al. |

(Continued)

FOREIGN PATENT DOCUMENTS

| EP | 0856746     | 8/1998 |
| WO | WO 89/03106 | 4/1989 |

(Continued)

OTHER PUBLICATIONS

XP-000822905: "Mobile Dating" from *Siemens Technik Report*; vol. 2, No. 3, © Apr. 1999.

*Primary Examiner* — Willie J Daniel, Jr.
(74) *Attorney, Agent, or Firm* — Ditthavong & Steiner, P.C.

(57) ABSTRACT

The present invention relates to a method and system for providing information about stations of a communication system, and more particularly information of stations (1) that are located within a defined area (5). A search can be triggered in a location information service for information concerning wireless stations within the defined area. At least one such access entity (20, 21, 23, 24) of the communication system is selected that covers partially or entirely the defined area. A location information request is subsequently generated and broadcast in the selected access entities. A response including information concerning wireless stations within the defined area is generated and signalled to the location information service. According to another aspect the system is adapted to provide services for those stations only that have been determined to be located within the defined area.

42 Claims, 5 Drawing Sheets

(56) References Cited

U.S. PATENT DOCUMENTS 5,930,699 A      7/1999  Bhatia
6,108,556 A *    8/2000  Ito .............................. 455/456.2
6,167,255 A *   12/2000  Kennedy et al. ........... 455/414.1
6,643,516 B1 *  11/2003  Stewart ...................... 455/456.6

FOREIGN PATENT DOCUMENTS

| WO | WO 98/19479 | 5/1998 |
| WO | WO 98/51104 | 11/1998 |
| WO | WO 99/05877 | 2/1999 |
| WO | WO 99/52316 | 10/1999 |

* cited by examiner

SERVICE PROVISION IN A COMMUNICATION SYSTEM

FIELD OF THE INVENTION

The present invention relates to provision of services in a communication system, and in particular, but not exclusively, to provision of services based on information that associates with the location of a station.

BACKGROUND OF THE INVENTION

A cellular telecommunications system is a communication system that is based on use of radio access entities and/or wireless service areas. The access entities are typically referred to as cells. Examples of cellular telecommunications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), IMT 2000, i-Phone and so on.

In a cellular system, a base transceiver station (BTS) provides a wireless communication facility that serves mobile stations (MS) or similar wireless user equipment (UE) via an air or radio interface within the coverage area of the cell. As the approximate size and the shape of the cell is known, it is possible to associate the cell to a geographical area. The size and shape of the cells may vary from cell to cell. Several cells may also be grouped together to form a larger service area. A base station may provide more than one cell. Each of the cells can be controlled by an appropriate controller apparatus. For example, in the WCDMA radio access network the base station (which may be referred to as Node B) is connected to and controlled by the radio network controller (RNC). In the GSM radio network the base station may be connected to and controlled by a base station controller (BSC) of a base station subsystem (BSS). The BSC/RNC may be then connected to and controlled by a mobile switching center (MSC). Other controller nodes may also be provided, such as a serving GPRS support node (SGSN). The MSCs of a cellular network are typically interconnected and there may be one or more gateway nodes connecting the cellular network e.g. to a public switched telephone network (PSTN) and other telecommunication networks such as to the Internet and/or other packet switched networks.

The cellular network apparatus and/or the mobile station can be employed for provision of location information of the mobile station and thus the user thereof. More particularly, the cells or similar geographically limited service areas and associated controller nodes facilitate the cellular telecommunications system to produce at least a rough location information estimate concerning the current geographical location of a particular mobile station. If the location of the cell is known, it is possible to conclude therefrom the geographical area in which the given mobile station (communicating in said cell) is likely to be at a given moment. This information may be provided also when the mobile station is located within the coverage area of a visited or "foreign" network. The visited network may be capable of transmitting location information of the mobile station back to the home network, e.g. to support location services or for the purposes of call routing and charging.

A mobile station may be provided with appropriate equipment to provide information on which the positioning of the mobile station can be based on. The mobile station may communicate the information via the base to an appropriate network element that may use the information in a predefined manner.

More accurate location information may be obtained based on various location estimation methods, e.g. based range difference (RD) measurements or by means of a global positioning system (GPS). The measurements may be accomplished at the mobile station or by a number base stations.

A location service functionality may be provided by a separate network element such as a location server which receives location information from the telecommunications system. If no further computations and/or approximations are made, this would give the location to an accuracy of one cell, i.e. it would indicate that the mobile station is (or at least was) within the coverage area of a certain cell.

3GPP specification 3GTS 23.032 v3.1.1 (2000-3) titled 'Universal Geographical Area Description' presents a possibility for defining geographical areas. The definition is based on shape and one or several location points. This concept may be referred to as DEfined Geographical Areas (DEGA). Based on this concept the mobile station measures its position. The station is adapted to compare the determined position to a defined geographical area. If it is determined that the mobile station has entered the defined area, the mobile station sends a notification thereof to the network. Information that is required for the area definition is stored at the mobile station. The DEGA information may be broadcast via the base stations to the mobile stations. The DEGA information may also be stored beforehand in a SIM/USIM (subscriber identity module/UMTS SIM) of the mobile station. The DEGA information typically consists of one or several geographical points and shapes as defined by the 3GTS 23.032 specification. The DEGA information may also include a unique name, identification number of other identifier for the defined area in question.

It might be useful for various commercial and non-commercial services and similar applications to have information concerning mobile stations that are located within a particular defined geographical area. In some applications it might be useful for the network element to be able to accomplish the operation for obtaining location information only in selected parts of the communication system. There are also applications where it might be useful to be able to locate selected mobile stations or subscribers in a defined area. For example, various organisations or even individuals may want to send information and/or offer services to mobile stations only in a particular defined geographic area and/or to certain type of subscribers in a particular geographical area. The mobile stations in a certain area and/or certain types of subscribers may also need to be tracked e.g. for fleet management purposes. There may also be a need for a quick provision of the location information. It may also be advantageous if the location information could be provided without causing excessive load into the resources of the communication network.

SUMMARY OF THE INVENTION

It is an aim of the embodiments of the present invention to address one or several of the shortcomings of the prior art services. Some of the embodiments aim to provide enhanced services based on information associated with a defined geographical area.

According to one aspect of the present invention, there is provided a method for providing information of stations of a communication system consisting of a plurality of access entities, comprising: selecting at least one access entity of the cellular communication system that covers at least a portion of a predefined area; transmitting a request for location information in said at least one access entity; receiving the request in at least one station within said at least one access entity; and signalling information that associates with the location of said at least one station.

Said information associated with the location of the at least one station may be signalled from an element that associates with the access entity to a location information service. The request for location information may include information associated with an address of the location information service and/or of the predefined area and/or information associated with the identity of the request.

The request for the location information is preferably broadcast in said at least one access entity. The request may be handled by one or more broadcasting centres based on information of the determined at least one access entity. The transmission of the request may comprise broadcasting of a short message service message in the selected access entities.

A system information message may also be broadcast on control channels of the selected access entities.

The step of determining the at least one access entity may be triggered by a request from a client.

A wireless station within a selected access entity may receive a broadcast request for location information. At least a part of the information concerning the location of the wireless station may then be determined at the wireless station.

An access network of the communication system may signal information concerning the stations within the determined at least one access entity to a location information service via at least one controller node of the communication system.

The selection of said at least one access entity may be based on association between the predefined area and said at least one access entity.

A node in the communication system may verify that a station that responded to the request is within the predefined area.

According to one aspect of the present invention, there is provided a method for providing services for a station of a communication system, comprising: creating information that defines a geographical area and at least one service available in said area; determining if the station is within said defined geographical area; notifying said at least one service that the station is located within said defined geographical area; and based on said notification, enabling the station to use the at least one service.

According to one aspect of the present invention, there is provided a location system that associates with a communication system, said communication system providing wireless communication services for stations by a plurality of access entities, the system comprising: controller means for selecting at least one access entity that covers at least a portion of a predefined geographical area; means for transmitting a location information request in said at least one access entity; means for determining information in response to the location information request, said information concerning one or more of the stations within said at least one access entity; and means for signalling said determined information.

According to one aspect of the present invention, there is provided an element for a location service, said location service being implemented within a communication system comprising access entities and providing wireless communication services for stations, the element comprising: a controller for selecting at least one access entity that covers at least a portion of a predefined geographical area; and means for generating a request for location information to be broadcast in said at least one access entity, wherein the request is signalled from the element to at least one another element of the communications system for triggering a procedure for obtaining information concerning stations within said at least one access entity.

According to one aspect of the present invention, there is provided a mobile station for a communication system, comprising: receiver means for receiving a location information request that has been broadcast in at least a portion of a predefined geographical area by an access entity of the communication system; a controller means for processing location information provided by a location measurement unit; a controller means for generating a response to the location request based on the location information and information in the location information request; and transmitter means for transmitting the response to an element of the communication system.

According to one aspect of the present invention, there is provided a communication system, comprising: means for providing information that associates with a predefined geographical area and at least one service available for stations in said area; a controller for determining based on said information if a station is within said predefined geographical area and for generating a notification indicative that the station is located within said predefined geographical area and the at least one service available for the station; and a service provision entity adapted to enable said at least one service for the station based on the notification.

According to one aspect of the present invention, there is provided a mobile station for a communication system, comprising: receiver means for receiving information that associates with a predefined geographical area and at least one service available within said area; a controller means for determining if the mobile station is located with the predefined geographical area based on information from location measurement means; a controller means for generating a notification indicating that the mobile station is located within the predefined geographical area and identifying said at least one service; and transmitter means for transmitting the notification to an element of the communication system.

The embodiments of the invention may provide a system and method by means of which it is possible to provide selective information concerning a station and/or a predefined area.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
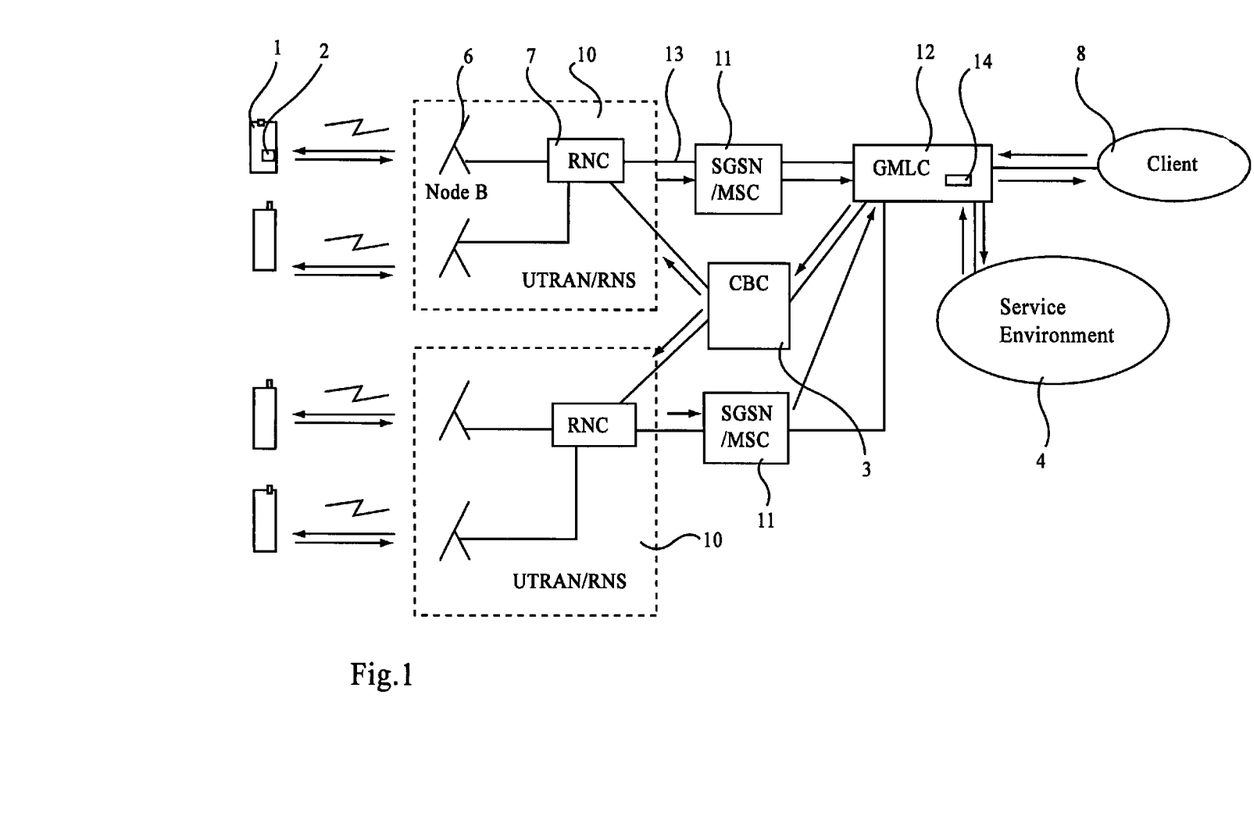
FIG. 1 shows some of the elements of a cellular communication system in which the embodiments of the present invention may be implemented.
Figure 2:
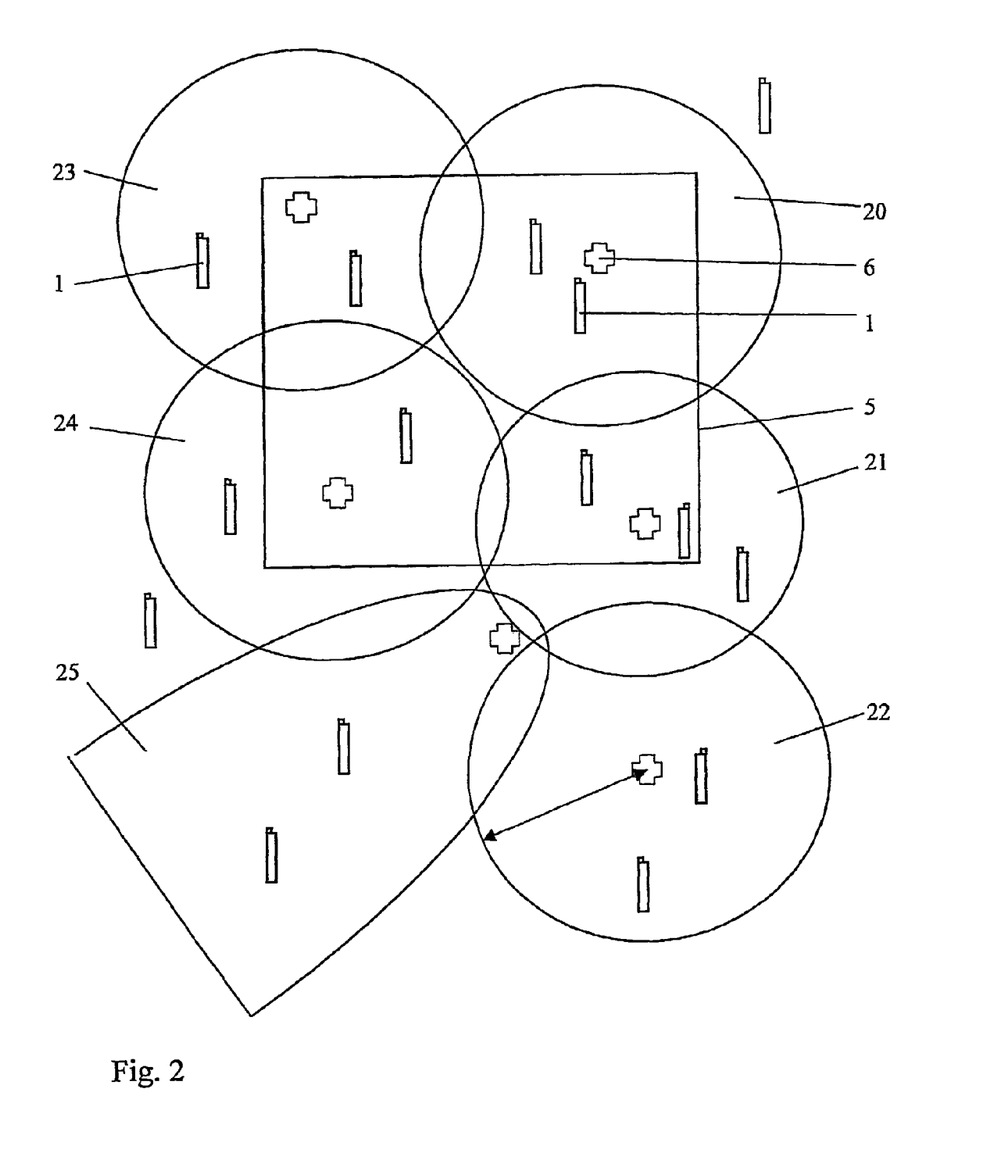
FIG. 2 shows a defined area covered by cells.

Reference is made first to FIGS. 1 and 2. FIG. 1 shows a part of a cellular public land mobile network (PLMN) in which the embodiments of the present invention may be employed.

FIG. 2 shows schematically an area covered by a plurality of access entities, i.e. cells of the cellular communication system of FIG. 1. Each cell has associated therewith a base station 6. The 3$^{rd}$ generation telecommunications systems the base station may be referred to as node B. The term base station will be used in this document to encompass all elements which transmit to and/or receive signals from mobile stations 1 or the like via the air interface. Likewise, the wireless station or mobile stations 1 are able to transmit signals to and receive signals from the respective base station via wireless communication with the base stations.

As shown by FIG. 2, a base station may provide differently shaped radio coverage, such as an omnidirectional coverage area or a sector beam provided with a directional or sector antenna. The sector base station may use e.g. three 120° directional antennae whereby three radio coverage areas are provided, or four 90° directional antennas providing four radio coverage areas and so on, or any combinations of different radio coverage beam widths. It should be appreciated that the size and shape of the cells or other access entities is typically not as regular as what is shown in FIG. 2, but will depend on the conditions in the area and the communication application.

The mobile stations 1 are able to move within the cell and also from one cell coverage area to another cell coverage area. The location of a mobile station may thus vary in time as the mobile station is free to move within the service area of the communication system.

The mobile station 1 may be provided with an appropriate terminal equipment 2 for the provision of location information, such as a processor unit. A possible operation of the unit 2 will be explained later.

Some of the elements of a UMTS (Universal Mobile Telecommunication System) network system will now be discussed in more detail before explaining the basic concept of the present invention. The mobile stations or user equipment 1 are arranged to communicate via the air interface with a respective base station 6. Each base station is controlled by respective a radio network controller RNC 7. The radio network controller RNC and the base station may sometimes be referred to as the radio network subsystem RNS or UMTS terrestrial radio access network UTRAN 10. The elements of the UTRAN can be included in either or both of the RNC and the base station. This is an implementation issue. It should be appreciated that a UMTS network is typically provided with more than two UTRANS and/or RNCs, and that each radio network controller is arranged generally to control more than two base stations 6. The radio network subsystem 10 may be connected to a controller node 11 such as a SGSN (serving GPRS support node) or a MSC (mobile switching centre). The SGSN 11 provides various control functions such as keeps track of the mobile station's location for the purposes of call routing and performs security functions and access control. The SGSN 11 may be connected to further nodes such as a GGSN (gateway GPRS support node; not shown). Although not shown, the UMTS system may also be connected to conventional telecommunication networks, such as to a GSM based cellular public land mobile network (PLMN) or to a public switched telephone network (PSTN) or to a data networks such as the Internet. The various networks may be interconnected to each other via appropriate interfaces and/or gateways. A more detailed description of the various element and functions of a third generation telecommunications system can be found e.g. in the 3GPP specification 3GTS 23.060 'General Packet Radio Service' which is incorporated herein by reference.

The geographical location of the base stations is known. The location of the base station may defined, for example, in X and Y co-ordinates or in latitudes and longitudes. It is also possible to define the location of the mobile station in vertical directions. For example, Z co-ordinate may be used when providing the location information.

FIG. 1 also shows a location services (LCS) node 12 providing location services for different applications or clients 8. In general terms, the LCS node can be defined as a function or entity capable of providing information concerning the geographical location of a mobile station. In FIG. 1 the node 12 is shown to comprise a gateway mobile location center (GMLC) provided in the core network side of the UMTS telecommunications system. It should be appreciated that a communication system may comprise more than one location server. Each of the location servers may have an individual address or other identifier so that the other elements of the system may communicate thereto. A more detailed description of a possible location server can be found, for example, from ETSI (European telecommunications Standards Institute) technical specification "Location Services" GSM 03.71 or 3GPP specification 3GTS23.171. These documents are incorporated herein by reference.

The location service node 12 of FIG. 1 is arranged to receive predefined information concerning the location of the mobile stations 1 from the radio access network via MSC and/or SGSN 11 connected by the appropriate interface means 13 to the access network 10. The location server 12 may be arranged to process information received from the network side and/or some other predefined parameters and/or to compute by processor means 14 appropriate calculations for determining and outputting information based on the geographical location of the mobile stations 1.

In normal operation, the location server 12 may be arranged to request for the location information and/or the information may be "pushed" from the PLMN network side to the server. The pushing of information associated with the geographical location of a mobile station may be initiated by said mobile station, as will be described later. In addition, the location server 12 may define the accuracy that is desired. The required accuracy may be indicated e.g. by so called quality of service (QoS) parameters included in a location information request.

It should be appreciated that the elements of the location service functionality may be implemented anywhere in the telecommunications system and that the actual location service implementation may be distributed between several elements of the system. In addition, more than one location service may associate with a telecommunication system, e.g. when two competing service providers have location service apparatus of their own.

As explained above, the location server node 12 obtains positioning information from the access network side 10. This information may be processed in a predefined manner and may then provided to a client 8. The client 8 is a logical functional entity that makes a request to the GMLC node 12 for information that concerns one or more of the mobile stations of the cellular system. The LCS client 8 may be an entity that is external to the PLMN. The client may also be an internal client (ILCS) i.e. reside in any entity (including a mobile station) within the PLMN. The client is entitled to receive at least some degree of information concerning the location (or location history) of the mobile stations 1.

The location server node 12 responds to a location request from a properly authorised location client 8 with information concerning mobile stations within an area specified by the location client 8 if authentication and other requirements are satisfied. The location Server 12 may thus provide the client 8, on request, the current or most recent geographic location (if available) of the mobile stations within the defined area or, if the location procedure fails, an error indication and optionally the reason for the failure.

The particular requirements and characteristics of a location client 8 are preferably known to the server 12 by its location client subscription profile. The particular client related restrictions may also be detailed in the subscription profile of the client. The location Server 12 may also enable a network operator to charge the client 8 for the location features that the network operator provides.

The location server node 12 may consists of a number of location service components and bearers needed to serve the location clients 8. The location server node 12 may provide a platform which will enable the support of location based services in parallel with other telecommunication services such as speech, data, messaging, other teleservices, user applications and supplementary services.

FIG. 1 discloses further a cell broadcasting centre CBC 3. The cell broadcasting centre may be employed in some embodiments for broadcasting location information requests in selected cells. It should be appreciated that although only one CBC is shown for clarity reasons, the system may include a number of CBCs.

A service environment entity 4 is also shown. The service environment 4 may be, for example, a database or record or any other functionality that may be used in some embodiments for associating a subscriber with a service characteristics or service profile of the subscriber. The service environment may also be used as a function that associates a geographical area with one or more of the cells. The purpose and operation of the cell broadcasting centre and the service environment functionality will be described in more detail in the following description of some embodiments of the present invention.

Figure 3:
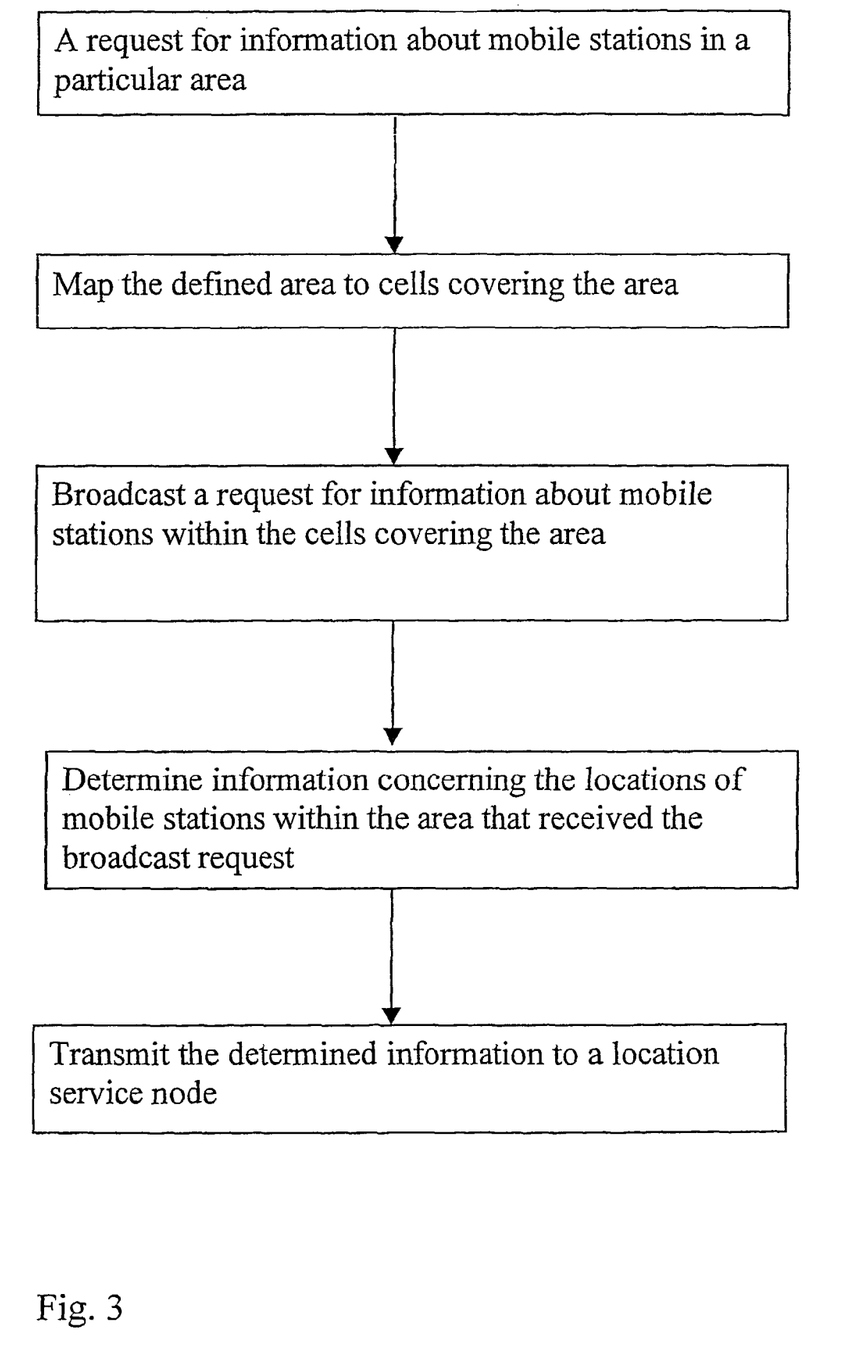
FIG. 3 is a flowchart illustrating the operation of one embodiment of the present invention.

Reference in now also made to the flowchart of FIG. 3 that shows a first embodiment of the invention, and more particularly, a procedure for locating subscribers. A selected group of subscribers or all subscribers may be determined to be located within a defined geographical area. The location may be based on service environment criteria provided by the service environment function 4. At the beginning the client 8 sends a location service request to the GLMC 12. The request may define a geographical area. Although FIG. 2 shows (for clarity reasons) that the requested area as a rectangular window 5, the defined area may have any appropriate shape such as ellipsoidal, polygonal or circular shape. The area may also be defined e.g. as an area within a defined radius or distance from a certain point (e.g. base station location or any other location), name of an area (e.g. name of a town, village or an organisation within a predefined area), by co-ordinates or latitudes and longitudes and so on. The area definition may also comprise an altitude parameter. The definition of the defined area may also comprise an uncertainty parameter. For example, an ellipsoid area may be defined with an uncertainty circle and so on.

The arrows of FIG. 1 indicate the possible signalling between the various network elements in accordance with the first embodiment. FIG. 1 shows an embodiment in which the request is sent from the client 8 to the GMLC 12. Instead of sending the request to the GMLC 12, the request may also be sent directly to the service environment functionality 4. The request may contain the definition of the geographical area that is to be searched, such as one or several geographical points and shapes as defined by the referenced 3GTS23.032 specification. According to a possibility the GMLC 12, the service environment 4 or another appropriate entity capable of providing a mapping function maps the defined area to cells belonging to the defined area. The mapping can be made, for example, by using existing lists of base station co-ordinates and their estimated ranges or by any other appropriate criteria. It is possible to define that only such cells are mapped that are entirely within the defined area. It may also be defined that it is enough is a predefined portion of the cell coverage area is within the defined area.

The GMLC 12 or Service Environment 4 sends a cell broadcast request to selected Cell Broadcast Centers (CBC) 3. The selected broadcasting centers are the ones that serve the cells in the defined geographical area. In FIG. 2 this would be cells 20, 21, 23 and 24. No broadcasting would occur in cells 22 and 25. The broadcasting message may be, for example, a short message service (SMS) message, a new system information message on broadcast control channels, or any other appropriate message that can be broadcast by the selected base stations towards mobile stations within the cell.

The message may be signalled first to the radio access network and further to the mobile stations within the selected cell. According to an alternative the message may not be signalled to the mobile stations, but the request is received and processed and the requested response information is generated by the elements of the radio access network.

The location information request message may contain various information. The following will discuss some possibilities for the information which may trigger the location procedures at the mobile station or at the radio access network.

According to an embodiment the broadcast message contains Area co-ordinates, request identity (ID) number and an address of the location service where the response is to be provided. After the above information is broadcast, only those mobile stations located within the specified cell receive the message (i.e. station within cells 20, 21, 23 and 24 in FIG. 2). After receiving the broadcasting message the mobile stations may locate themselves or the network may locate the mobile station.

The location procedure may be accomplished by the processor unit 2 of the mobile station. The location may be based on any appropriate technique, such as MO-LR (mobile station originated location request), mobile station based E-OTD (enhanced Observed time difference), GPS (Global Positioning System) or DGPS (differential GPS) and so on. The accurate location of the mobile stations may be estimated or calculated by using existing location methods. The mobile station may check whether it is in the defined geographical area or not. Mobile stations 1, which are inside of the defined area 5, may then send information concerning their location and the request ID number to the GMLC or Service Environment, depending on the request. The mobile station may attach the address of the correct GMLC to the response. In other words, by means of the location procedure by the processor unit 11 those mobile stations that are not within the defined area 5 can be excluded and only those mobile stations that are within the defined area will respond to the broadcast request. The GMLC 12 or Service Environment 4 collects the information about all mobile stations located in the defined geographical area according to the request ID number. The information concerning the stations is then sent to the client.

According to an alternative, the message contains co-ordinates that can be used to define the area and GMLC/Service Environment Address. After the broadcasting, and after the mobile stations have received the broadcast message, they may locate themselves or the location information may be provided by the network. As above, the location of the mobile station may be calculated by using the existing location methods and the mobile station may check whether it is in the defined geographical area or not. All mobile stations inside the defined area will send their location to the GMLC or Service Environment by means of an appropriate communication media based on the address information received with the request. The GMLC or Service Environment collects the information about all mobile stations located in the defined geographical area, whereafter the information is transmitted to the client.

According to an alternative the message contains a Request ID number and the address of the GMLC/Service Environment entity. After the broadcasting, and after the mobile stations have received the broadcasting message, they locate themselves. Their location may be calculated by using existing location methods. The mobile stations will send their location and request ID number to the GMLC or Service Environment e.g. via the radio access network 10 and the controller node 11 based on the address information. The GMLC or Service Environment may check whether the mobile station belongs to the defined area of the request. If the mobile station belongs to that area GLMC or Service environment collects information about the mobile station having certain request ID number. That information is then sent to the client.

It is also possible that the request does not contain any specific information. After the mobile stations have received the broadcasting message, each of the mobile stations may locate itself or each of the station may simply signal an acknowledgement to the network. The mobile stations may transmit the location information to the network without any knowledge of the actual destination address of the response. The response will be received by the radio access network, whereafter the radio access network may route the response to a correct location server. The access network controller may alternatively route the response to any other predefined element. For example, in the GSM location service the response from the mobile station may include a request to transfer the location to a LCS client. By means of this the GMLC becomes informed about the location of the specific mobile station. The GMLC may check whether the specific mobile station belongs to the defined area of the request. If the mobile station belongs to the defined area the GLMC (or Service environment) adds the information about the mobile station into the information of other mobile stations belonging to the area of the request. That combined information is then sent to the client.

The broadcast message may also include further information, such as an indication of the selected mobile stations that should respond or indication of the type of request (e.g. emergency call, commercial/non-commercial advertisement, tracking and so on). The selection of the mobile station may be based on the information stored at an appropriate database entity, such as in the service environment 4. For example, it is possible to select only such subscribers that have ordered a certain service or at least one service among a group of predefined services.

The mobile station 1 may selectively respond only to those broadcast requests the control unit 2 thereof is adjusted to accept. For example, an advertisement directed to all stations within a predefined geographical area may include an indication of the type of the advertisement, such as "Italian restaurant", and only those mobile stations or subscriptions that are predefined to respond to such messages will transmit location information back to the network. The location may be based on the service profiles of the individual subscribers, i.e. depend of the services the subscriber has ordered. The service environment may also include other information, such as age, sex, address and preferences of the subscriber.

It is also possible to enable the user of the mobile station to select whether he wishes to be subjected to the location service at a given moment or not and/or whether the user wishes that any information concerning him will be signalled to the location service node 12.

According to an embodiment, only such mobile stations may send any response to the broadcast message that support at least one location method and are capable of locating themselves. An alternative embodiment enables location of mobile stations which are not supporting any positioning method. In this embodiment the broadcasting centre 3 may signal the message towards the selected base stations or other element of the radio access network 10. However, instead of transmitting the message further to the mobile stations, the radio access network 10 may define the mobile stations that are located within the area and respond to the GMLC with an appropriate message. According to further possibility, the broadcast request is received and processed, and location data is collected by the RNC or any other appropriate element of the radio access network. The mobile station may be located e.g. based on TOA (Time of Arrival) or CI (Cell ID) TA (Timing advance) RX (Radio Transmission) level or radio signal strength methods. The mobile stations within the defined area may also be triggered to report to the network if they are in certain cell so that an appropriate network element, such as the RNC, can locate them.

In the FIG. 1 arrangement the cell broadcast centre 3 is arranged to receive the request signalling from the GMLC 12 and to generate and transmit appropriate message to the selected radio access networks 10. According an embodiment the responses from the access network 10 side are then signalled through conventional signalling paths, i.e. via the SGSN or MSC 11, to the GMLC 12. It should be appreciated that the responses may also be signalled through the CBC node and that the CBC node may provide some control functions concerning the response signalling as well. It should also be appreciated that although the CBC 3 is shown to be a separate node, the CBC function may be implemented within one or several of the existing nodes of the network.

As shown by FIG. 2, it is possible that the cells do not provide a full coverage of the defined area 5. The completeness requirements for the coverage may be defined to fit the application, e.g. such that better coverage is required in tensely populated areas, e.g. in cities, than in rural areas.

It shall also be possible for the location determining process to make use of several sources of location information in determining the mobile station within a certain area and/or the more accurate locations thereof. The location service shall be capable of making use of the restricted or the extra information as appropriate for the service being requested. The accuracy of the location determination may be improved further by utilising results of the various location measurement and/or determination techniques.

The response may indicate all mobile stations that are located within the cell. It is also possible to use some less rough location method, and indicate only such mobile station in the response that are within the defined area. The response may also include more accurate information concerning the actual locations of individual mobile stations within the cells and/or the defined area.

More accurate location information may be obtained e.g. by calculating the geographical location of the mobile station from range difference (RD) measurements, such as observed time difference (OTD), E-OTD (Enhanced OTD) and time difference of arrival (TDOA) measurements. More particularly, the reliability of the location determination may be improved by utilising results of measurements which define the travel time (or travel time differences) of the radio signal sent by the mobile station to the base station. The measurements are accomplished by a number (preferably at least three) base stations covering the area in which the mobile station under consideration is currently located. The measurement by each of the base stations gives the distance (range) between the base station and the mobile station or distance difference (range difference) between the mobile station and two or more base stations.

According to a further embodiment, the CBC node 3 may include the controller for selecting one or more cells that cover the defined geographical area. The CBC node 3 may generate the location information request and transmit it to the radio access network to be broadcast in the selected cells. The CBC node may also be used for generating a location information request that is based on the service environments of the subscribers.

Figure 4:
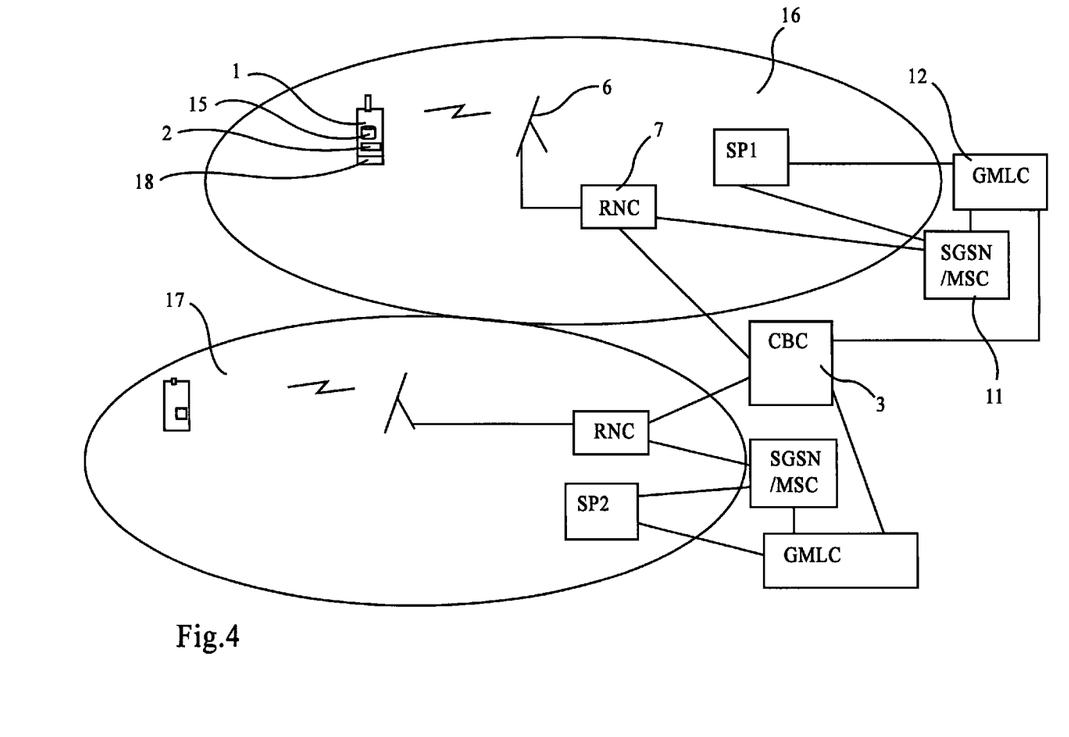
FIG. 4 shows another embodiment.
Figure 5:
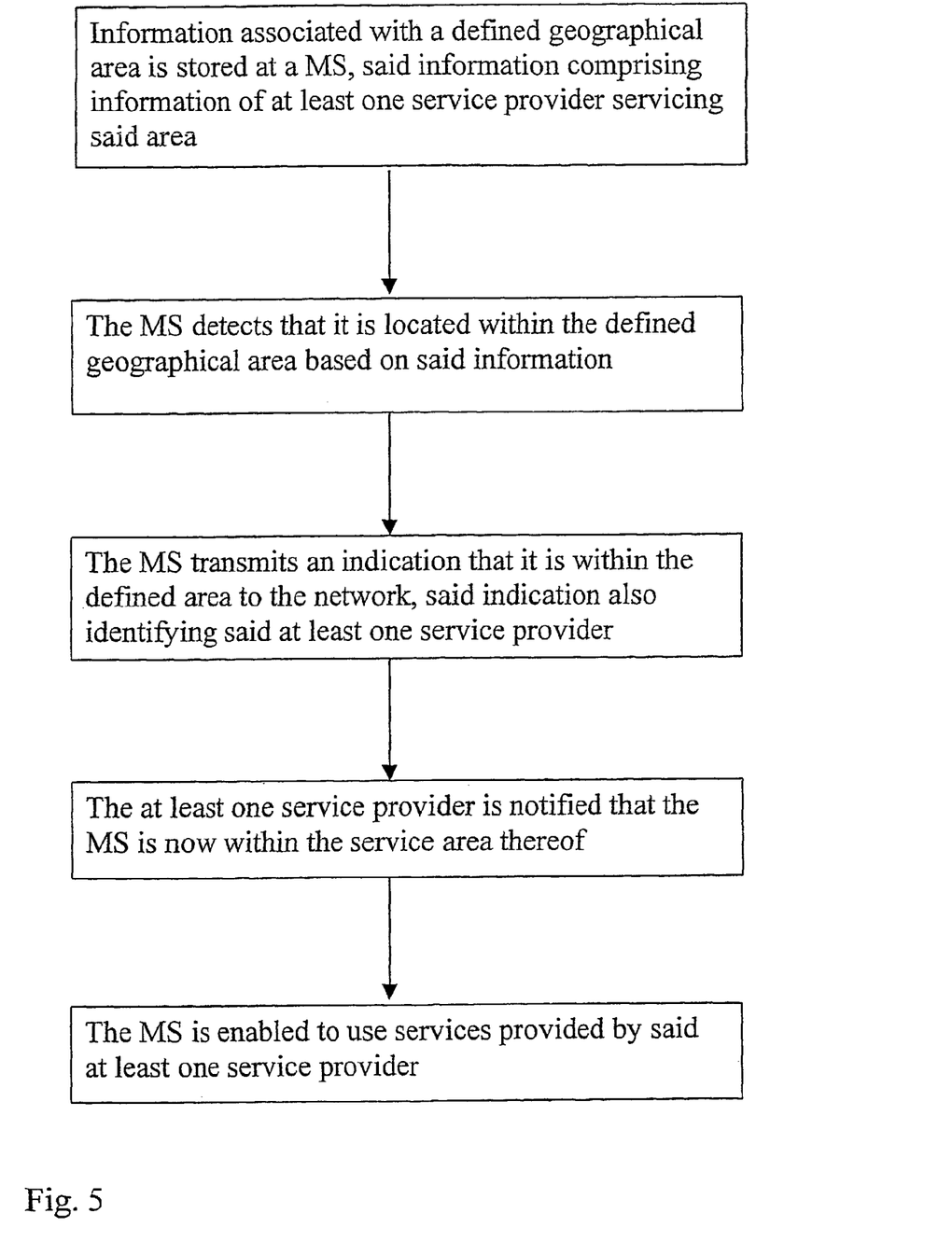
FIG. 5 is a flowchart illustrating the operation of the FIG. 4 embodiment.

According to a further embodiment described with reference to FIGS. 4 and 5, at least part of the information used for defining a particular geographical area 16 is stored at a memory unit 15 of a mobile station 1. The memory unit may consist of a SIM/USIM (subscriber identity module/UMTS SIM) of the mobile station 1. The information defining the area 16 may consists of one or several geographical points and shapes as defined by the 3GTS 23.032 specification. The area related information may also include, for example, a unique name, identification number of other identifier for the defined area in question. In a preferred form of the embodiment, the area definition is not dependent on the coverage areas of the access entities of the communication system.

The broadcasting center 3 of the communication system may be arranged to broadcast the required information via base stations 6 to mobile stations. The broadcasting may be accomplished only to those mobile stations which are located within the defined area. The information may also be broadcast to mobile stations close to the defined area 16 or to any other such mobile station that are likely to enter the area at some stage. To save memory capacity, the mobile station 1 may be adapted to store the information only temporarily as long as it is located within the area 16 or in close vicinity thereto.

Information associated with the defined area may also be stored beforehand in the memory unit 15, e.g. during the initial programming or upgrade of the control software of the mobile station.

If the defined service area information is stored in the memory unit 15 of the mobile station 1 it can be used to support regional and/or local service provision. According to a preferred embodiment the mobile station 1 is provided with a location measurement unit 18. It should be appreciated that the mobile station may receive the location information from another source, such as from a location measurement unit that is implemented at the network side of the system.

The mobile station compares the defined area information and the location information. When the mobile station 1 finds out that it has entered or is within the area 16 defined by the information stored therein it transmits a notification of this to an appropriate element, such as the service environment or an application server of a related local service provider.

The notification may be transferred transparently in the mobile network. According to a further embodiment, the mobile station may send this notification first to the MSC or SGSN 11. In this embodiment MSC or SGSN sends the notification further to the service environment or the application server of the related local service provider. The MSC/SGSN 11 may also be adapted to modify or even stop i.e. cancel the notification process before the notification is provided for the service provider. This may be determined by the main network operator. A location service node GMLC 12 may also be involved in, or notified about, the notification transaction e.g. for billing purposes.

The notification may be sent to one or several service providers SP1, SP2 providing services for mobile stations within the defined area. After the service provider has received the notification that a mobile station is within the defined area, the service provider may activate local or enhanced services for said mobile station.

In a preferred embodiment the defined geographical area information includes the identity and address of the service provider serving the geographical area. The information may also include service definitions applicable in the area. The information may contain an indication (e.g. a service provider address) from where service information can be requested or any other additional information that may be found useful in this context.

The information of the defined area may be used to limit the geographical service area (SA) of the mobile station 1. The limitation may be e.g. used to limit the service area 16 where a given Service Provider SP1 can serve and charge its subscribers. When the subscriber leaves the service area 16 the mobile station is no longer enabled to use the (enhanced) services of the service provider SP1. When leaving the area 16, the mobile station 1 may send a notification thereof to the service provider SP1.

When leaving the service area, the subscriber may roam a service area 17 of another service provider SP2. If the roaming is not technically possible, or if the roaming is not commercially agreed between the two service providers SP1 and SP2, the mobile station 1 will not get any (enhanced) services provided by the service provider SP2.

The arrangement may be such that the mobile station 1 may always have access to the (basic) telecommunication services of its own network operator or the main service provider, but the enhanced services are provided only if this is enabled based on the defined area information.

One possibility is to classify the various operators (service providers) to access network operators who are licensed by the regulator (such as the local government) and regional (local) service providers. The access network providers could then use the above described embodiment to sell the right to operate a regional service areas 16 and 17 to one or several of the regional (local) service providers SP1 and SP2, respectively. Information regarding the regional service providers that serve specific local areas is broadcast to mobile stations within the respective defined areas 16 and 17. The mobile stations may then utilise the services provided by the current local operator (local service provider) based on that information. The access network provider may provide the basic services (such as ordinary telephone calls) whereas the local service providers may provide the enhanced communication services, such as internet browsing or any local services. The access network operator may thus sell the right to operate selected services to one or several regional service providers. It is also possible that the local operators provide all communication services.

It should be appreciated that instead of performing the above determination and notification generation procedure in the mobile station, the procedure may be at least partially be accomplished by one or several of the network elements. For example, the MSC/SGSN 11 or a stand alone controller element (not shown) may be provided with necessary information to be able to monitor for mobile stations that have entered a defined area.

The information provided by the location service may be used for several purposes, the following being only some examples of these. The telecommunication system itself may use the information e.g. for call routing, resource allocation and so on. The location service can be used to determine mobile stations within a particular area from which an emergency call has been made. Since the area is known, other mobile stations (all or only selected mobile stations) in that particular area or close thereto may be paged or broadcast e.g. to be able to warn the users thereof from a danger (e.g. gas leak) or to request help from the public (e.g. to catch a pet that has gone loose). Clients may also be organisations that broadcast location related information to mobile stations in a particular geographic area—e.g. on weather, traffic, hotels, restaurants, or the like. These possible applications include different local advertisement and information distribution schemes (e.g. transmission of information directed to those subscriber only who are currently within a certain area and who associate with a predefined service profile), area related WWW-pages (such as time tables, local restaurant, shop or hotel guides, maps local advertisements etc.) for the users of mobile data processing devices, and so on. Tracking of mobile users in a certain area by anyone who wishes to receive this information and is legally entitled to obtain it is also made possible. The 'Yellow Pages' or similar online directory services may be offered by the service providers per city or region basis. The service provider may interact to connect the user to local companies. Local marketing and advertising is enabled for stations that are detected to be within a particular area. The local marketing information may be broadcast to stations within the area. Alternatively, since the mobile stations that are located within the area are known, it is possible to transmit point to point messages to selected stations. Local organisations may sponsor connections and downloading of data for stations that are located within the defined area. It should be appreciated that there are several other possible commercial and non-commercial applications which may use the information provided by the embodiments of the invention.

Embodiments may provide a system which enables location of all or selected mobile stations within a selected geographical area. It should be appreciated that while the embodiments are described in the context of mobile stations, the embodiments of the present invention are applicable to any other suitable type of user equipment or stations, such as portable data processing devices or web browsers. Correspondingly, in addition to cells of a cellular communication system, the invention is applicable to any other suitable entity providing access for stations.

It should be appreciated that it is possible to base the geographical area definition on the association between the defined area and cell coverage areas of the communication system. However, the embodiments of the invention enable also operation of system in which the association between the cells coverage areas and the defined area is not required.

It should also be appreciated that while in the above the exemplifying embodiments of the invention have described in the context of a WCDMA (Wideband Code Division Multiple Access) UMTS (Universal Mobile Telecommunications System) and/or a GPRS (General Packet radio Service), the embodiments of the present invention are also applicable to any other cellular communication system which deals with packet data, non-packet data, voice communication and so on.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
selecting a plurality of access entities of a cellular communication system that cover at least a portion of a predefined area, wherein the predefined area is not dependent on the coverage of the plurality of access entities;
transmitting a request for location information in at least one access entity, the request comprising a definition of the predefined area;
receiving the request in at least one station within the at least one access entity after the request is transmitted to a radio access network, the request including a request identity number;
determining whether a location of the at least one station is within the predefined area; and
signalling information that associates with the location of the at least one station, wherein the information includes the request identity number and the cellular communication system comprises the plurality of access entities,
wherein the determining whether the location of the at least one station is within the predefined area is performed within the at least one station; and
wherein information is signaled about only the at least one station that is determined to be within the predefined area, and the plurality of access entities include one or more cells of the cellular communication system and each of the cells is associated with a base station.

2. A system, comprising: a controller configured to select a plurality of access entities that cover at least a portion of a predefined area, the predefined area is not dependent on a coverage of the plurality of access entities; a transmitter configured to transmit a location information request in at least one access entity, the location information request comprising a definition of the predefined area, the location information request includes an indication of the type of request; a determining unit configured to determine information in response to the location information request, the information concerning whether one or more of the stations within the at least one access entity are within the predefined area; and a signalling unit configured to signal the determined information, wherein a communication system is configured to provide wireless communication services for stations by the plurality of access entities, wherein the determining unit and the signalling unit are within the one or more of the stations, and wherein information is signaled about those stations only that are determined to be within the predefined area, and the plurality of access entities include one or more cells of the communication system and each of the cells is associated with a base station.

3. A system as claimed in claim 2, wherein the location information request is received at a station within the selected access entity and at least part of the response information is determined by the station.

4. A system as claimed in claim 2, comprising at least one broadcasting node that is adapted to generate a broadcast message based on information of the at least one access entity selected based on the predefined area.

5. A system as claimed in claim 2, wherein the system is adapted to map the predefined area to coordinates and/or ranges of base stations of the access entities.

6. A system as claimed in claim 2, wherein one or more of the access entities are selected based on information contained in a service environment entity of the communication system.

7. An apparatus, comprising:
a controller configured to select a plurality of access entities that cover at least a portion of a predefined area, the predefined area is not dependent on a coverage of the plurality of access entities;
a generator configured to generate a request for location information to be transmitted in at least one access entity, the request including a request identity number;
wherein the request is signaled from the apparatus to at least one other apparatus of a communications system configured to trigger a procedure to obtain information concerning stations within the at least one access entity, the request comprising a definition of the predetermined area and the information comprising whether the stations are within the predefined area,
wherein a location service is implemented within the communications system comprising access and providing wireless communication services for stations,
wherein the stations are configured to determined whether they are within the predefined area, and
wherein information is signaled about those stations only that are determined to be within the predefined area, and the plurality of access entities include one or more cells of the communication system and each of the cells is associated with a base station.

8. The apparatus of claim 7, wherein the location information comprises information of an address of the location service.

9. The apparatus of claim 7, wherein the controller is further configured to select the plurality of access entities by mapping the predefined area to coordinates and/or estimated ranges of base stations of the plurality of access entities.

10. The apparatus of claim 7, wherein the controller is further configured to select the plurality of access entities in response to a request from a client.

11. The apparatus of claim 10, wherein the request from the client defines the predefined area.

12. The apparatus of claim 7, wherein the predefined area comprises at least one of a name of the predefined area, coordinates of the predefined area, longitude and latitude coordinates of the predefined area, a range from a particular location, and a shape of the predefined area.

13. An apparatus, comprising:
a receiver configured to receive a location information request that has been transmitted in at least a portion of a predefined area by an access entity of a communication system, the predefined area is not dependent on a coverage of the access entity;
at least one processor configured to process location information provided by a location measurement unit, configured to determine whether the apparatus is within the predefined area using the location information and information in the location information request, and configured to generate a response to the location information request based on the determination; and
a transmitter configured to transmit the response to a node of the communication system,
wherein the location information request includes a request identity number and information defining the predefined area; and
wherein information is signaled about stations only that are determined to be within the predefined area, and the access entity includes one or more cells of the communication system and each of the cells is associated with a base station, respectively.

14. The apparatus of claim 13, wherein the location information comprises information of an address of a location information service.

15. The apparatus of claim 13, wherein the predefined area comprises at least one of a name of the predefined area, coordinates of the predefined area, longitude and latitude coordinates of the predefined area, a range from a particular location, and a shape of the predefined area.

16. The apparatus of claim 13, wherein the location information request comprises coordinates of the predefined area and/or the request identity number.

17. The apparatus of claim 13, wherein the location information request comprises information for identifying the request.

18. The apparatus of claim 13, wherein the location information request comprises a system information broadcast channel message.

19. The apparatus of claim 13, wherein the response comprises at least one of a request identity number, an address of a location information service, and coordinates of the predefined area.

20. A method, comprising:
selecting a plurality of access entities that cover at least a portion of a predefined area; and
transmitting a request for location information in at least one access entity to at least one other apparatus of a communications system configured to trigger a procedure to obtain information concerning stations within the at least one access entity, the request comprising a definition of the predefined area and an identity number, and the location information comprising whether the stations are within the predefined area,
wherein a location service is implemented within the communication system comprising access entities and providing wireless communication services for stations,
wherein the stations are configured to determine whether they are within the predefined area, and the predefined area is not dependent on a coverage of the plurality of access entities, and
wherein information is signaled about those stations only that are determined to be within the predefined area, and the plurality of access entities include one or more cells of the communication system and each of the cells is associated with a base station.

21. A method as claimed in claim 20, wherein the transmitting the request for the location information comprises broadcasting in the at least one access entity.

22. A method as claimed in claim 20, wherein the selecting the plurality of access entities comprises selecting so that a predefined level of coverage of the predefined area is obtained, and the plurality of access entities include one or more cells of the communications system and each of the cells is associated with a base station.

23. A method as claimed in claim 20, wherein the predefined area is defined by at least one of the name of the predefined area; coordinates of the area; longitude and latitude of the area; range from a particular location; or shape of the area.

24. A method as claimed in claim 20, wherein a wireless station within the access entity receives a broadcast request for location information and in response to the request at least a part of information concerning the location of the wireless station is determined at the wireless station.

25. A method as claimed in claim 20, wherein an access network of the communication system signals information concerning the stations within the determined at least one access entity to a location information service via at least one controller node of the communication system.

26. A method as claimed in claim 20, wherein the transmitting the location information request comprises broadcasting a short message service message in the selected access entities.

27. A method as claimed in claim 20, wherein the location information request comprises a system information message that is broadcast on control channels of the selected access entities.

28. A method as claimed in claim 20, wherein the selecting comprises selecting at least one access entity based on an association between the predefined area and the at least one access entity.

29. A method as claimed in claim 20, further comprising: determining those stations within the at least one access entity that are located within the predefined area before a provision of the location information.

30. A method as claimed in claim 20, wherein a location information request without any request specific information triggers a location procedure in a station receiving the request.

31. A method as claimed in claim 20, wherein an apparatus in the communication system verifies that a station that responded to the request is within the predefined area.

32. A method, comprising:
receiving a location information request that has been transmitted in at least a portion of a predefined area by an access entity of the communication system, the predefined area is not dependent on a coverage of the access entity;
processing location information provided by a location measurement unit, configured to determine whether an apparatus is within the predefined area using the location information and the information in the location information request;
generating a response to the location request based on the determination; and
transmitting the response to a node of the communication system,
wherein the location information request comprises information defining the predefined area, and the location information request includes quality of service parameters and information for identifying the request; and wherein information is signaled about only any station determined to be within the predefined area, and the access entity includes one or more cells of the communication system and each of the cells is associated with a base station.

33. A method as claimed in claim 32, wherein the receiving comprises receiving the location information request signalled from an element that associates with the access entity to a location information service.

34. A method as claimed in claim 33, wherein the location information request includes quality of service parameters and information of an address of the location information service, and wherein the response is routed to the location information service based on the address information.

35. A method as claimed in claim 32, further comprising:
providing a service to the at least one station, based on the at least station being located within the predefined area, wherein the location information request comprises information of the predefined area.

36. A method as claimed in claim 32, wherein the location information request is handled by one or more broadcasting centers based on a determined at least one access entity.

37. A method as claimed in claim 36, wherein the determination of the at least one access entity comprises mapping the predefined area to coordinates and/or estimated ranges of base stations of the access entities.

38. A method as claimed in claim 36, wherein the determination of the access entities is triggered by a request from a client.

39. A method as claimed in claim 38, wherein the request from the client defines the predefined area.

40. A method as claimed in claim 32, wherein the location information request comprises coordinates of the predefined area and/or a request identity number.

41. A method as claimed in claim 40, wherein a response to the request comprises at least one of the request identity number; an address of the location information service; or co-ordinates of the predefined area.

42. A method as claimed in claim 32, wherein additional information is included in the location information request, the additional information specifying at least one of the request or limiting the number of stations that are to be reported to a location information service as response to the request.

* * * * *